INVENTOR.
JOHANNES R. VAN GEUNS

Dec. 3, 1968     J. R. VAN GEUNS     3,413,814
METHOD AND APPARATUS FOR PRODUCING COLD
Filed March 2, 1967     3 Sheets-Sheet 3

INVENTOR.
JOHANNES R. VAN GEUNS
BY
AGENT

United States Patent Office 3,413,814
Patented Dec. 3, 1968

3,413,814
METHOD AND APPARATUS FOR
PRODUCING COLD
Johannes Rudolphus van Geuns, Emmasingel, Eindhoven, Netherlands, assignor to North American Philips Company, Inc., New York, N.Y., a corporation of Delaware
Filed Mar. 2, 1967, Ser. No. 620,005
Claims priority, application Netherlands, Mar. 3, 1966, 6602744
29 Claims. (Cl. 62—3)

ABSTRACT OF THE DISCLOSURE

A method and apparatus for producing cold in which the entropy of a paramagnetic substance is alternately varied by varying an external parameter such as a magnetic field, and a fluid medium such as helium gas is flowed in alternate directions in heat-exchange relationship with the substance. During the directional flows heat and cold respectively are dissipated from the substance to the fluid, and corresponding to these flows there is heat-exchange relationship first by a portion of the fluid with an area absorbing heat from the fluid, and subsequently by a remote portion of the fluid with an area to be cooled. Fluid in the first area is at a generally higher temperature than fluid in the area to be cooled, and portions of fluid in the two areas are not intermixed.

---

This invention relates to methods of producing cold, more particularly at very low temperatures, in which at least one preparation of a material which undergoes a variation in entropy upon variation of an external parameter is subjected to alternating variations in the relevant parameter, cold and heat being dissipated from each preparation at least during variation of the relevant parameter while substantially maintaining constancy of temperature. The invention also relates to devices for carrying out such methods.

In a known method and device of the kind to which the present invention relates, a preparation of a paramagnetic material undergoes variation in an external parameter by being alternately magnetized and demagnetized. The entropy of a paramagnetic material in a magnetic field of predetermined strength is lower than that in a magnetic field which is zero. This implies that, in order to maintain the temperature of the preparation constant, heat must be dissipated upon magnetisation and heat must be supplied upon demagnetisation.

In addition to paramagnetic substances, further substances are known in which a similar kind of caloric effect occurs, for example, upon magnetisation of a superconductor and upon de-electrification of a paraelectric substance.

The said caloric effects are improved as the temperature is lower.

In the known device the preparation is submerged in liquefied helium, the preparation being connected by strips of material to a heat-producing area (to be cooled) and a heat-absorbing area (cooled) for the dissipation and supply of heat respectively. The strips are made of a material which is superconducting at the temperatures prevailing, the strips being brought out of their superconducting state at the desired instants by magnetisation. Thus, as it were, heat valves are obtained which enable a thermal flow to be extracted from the area to be cooled and passed on via the preparation to the cooled area.

An object of the invention is to provide an improved embodiment of the method above described.

The method according to the invention is characterized in that one or more preparations of the said substance are placed in a medium stream which flows alternately in one direction and the opposite direction relative to the preparations in such manner that each preparation is in heat-exchanging contact with the medium, the medium being chosen of a kind which has a high specific heat relative to the relevant substance in the conditions prevailing, the variation in the relevant parameter at each preparation taking place substantially at the instant when the direction of the medium stream is reversed, the medium stream at each preparation, after passage in one direction during which heat is absorbed from the preparation, being brought into heat exchange with a cooled area or zone and, after passage in the other direction during which heat is given off to the preparation, being brought into heat exchange with an area or zone to be cooled, the medium stream flowing in both directions relative to each preparation over a distance such that the medium present at any moment at the cooled area never reaches the area to be cooled.

In the method according to the invention part of the medium stream will have the temperature of the cooled area. This area may be cooled, for example, with the aid of fluid helium or liquid hydrogen or some type of refrigerator or other.

Another part of the medium stream will have the lower temperature of the area to be cooled. Between these two portions is a portion of gas stream which has a temperature gradient and which acts as a regenerator, that is to say heat is stored in this portion of the gas stream when the preparation is brought from the temperature of the cooled area to the temperature of the area to be cooled and, on the other hand, heat is given off from this portion of the medium stream to the preparation when the medium flows in the other direction. By choosing a medium having a high thermal capacity relative to that of the preparation, the temperature in the portion of the medium stream which acts as a regenerator will only vary very slightly. Helium at a pressure of ±20 atms. has been found very satisfactory.

A method is thus obtained which permits of producing cold at low temperatures in a continuous process in a simple manner and with good efficiency. Another advantageous embodiment of the method according to the invention is characterized in that at each preparation that side of the cooled area or area to be cooled which is adjacent the preparation lies at a distance from this preparation which is at least equal to the length of that portion of the medium stream which has a temperature gradient, so that this portion of the medium stream, which regeneratively extracts heat from the preparation when flowing in one direction and regeneratively gives off heat to the preparation when flowing in the other direction, never reaches the cooled area or the area to be cooled.

Another advantageous embodiment is characterized in that the cooled area is cooled at a temperature lower than 30° K.

In another advantageous embodiment of the method according to the invention the pressure of the medium is continuously maintained higher than the critical pressure, thus preventing any phase transition between the gaseous state and the liquid state. As is well-known, such transition takes place, as it were, continuously at a pressure higher than the critical pressure. In another embodiment of the method according to the invention, especially when using helium, it is advantageous for the operating conditions and more particularly the pressure to be such that no phase transition, in this case to the solid state, occurs in operation.

In another advantageous embodiment in which temperatures lower than 2.5° K. occur, the medium chosen is the isotope He³. Ordinary helium is not usable at the said low temperatures on account of the λ-transition.

It is to be noted that the method according to the invention can be carried out not only with a supercritical medium. It is also possible that the medium is a liquid, provided the temperatures are such that this liquid remains in the liquid phase.

The invention also relates to a device for carrying out the method above described, which device includes at least one preparation of a substance which undergoes a variation in entropy upon variation of an external parameter and one or more devices for producing or varying the relevant parameter, means being provided to dissipate heat or cold from each preparation. According to the invention the device is characterized in that it has one or more channels each containing a medium which can travel forwards and backwards by the action of piston-like bodies coupled to a driving mechanism, each channel having one or more cooled areas each co-acting with one or more areas to be cooled, one or more of the said preparations being arranged between each cooled area and the co-acting area or areas to be cooled in such manner as to be in good heat-exchanging contact with the medium, and the medium in the conditions prevailing in operation, having a high specific heat relative to the substance of which the preparations are made, the piston-like bodies moving the medium in both directions relative to each preparation over a length such that the medium present at any moment at the cooled area never reaches the area to be cooled.

The device for producing or varying the said parameter may be formed, for example, by an electromagnet the field of which is varied. It is also possible to use a magnet having a constant magnetic field and to move the associated preparation and the magnet relative to one another so that the magnetisation of the preparation varies in the desired manner.

Another embodiment of the device according to the invention is characterized in that in operation the portion of the medium stream which dissipates heat to the cooled area has a higher temperature than the portion of the medium stream which dissipates cold to the area to be cooled, the portion of the medium stream between the said two portions having a temperature which progressively varies between the said two temperatures, this portion regeneratively extracting heat from the preparation when flowing to the cooled area and giving off this amount of heat again to the preparation when flowing in the other direction.

Another embodiment of the device according to the invention is characterized in that at each preparation that side of the preparation which is adjacent to either a neighbouring preparaiton co-acting therewith or a cooled area or area to be cooled which co-acts therewith lies at a distance from the relevant preparation or from the relavant cooled area or area to be cooled which is at least equal to the length of that portion of the medium column which acts as a regenerator during operation. Consequently, in this device, there is no risk that the portion of the medium stream which acts as a regenerator reaches the cooled area or the area to be cooled.

In another embodiment each preparation is a gas-permeable mass having a cross-section which corresponds to the cross-section of the channel in which it is contained.

In another embodiment the piston-like bodies which move the medium have the same volume of stroke, said bodies moving at least substantially with the same phase so that the total volume between them is at least substantially constant. Since the temperature of the medium varies but slightly on account of its high thermal capacity, the pressure of the medium will therefore also be substantially constant. Two pistons moving with the same phase are to be understood to include a displacer which bounds at each extremity one end of the medium column.

In another advantageous embodiment of the device according to the invention the space between each preparation and either an adjacent preparation which co-acts therewith or a cooled area or area to be cooled which co-acts therewith is filled with a gas-permeable mass which may have a structure similar to that of the relevant preparation.

The said masses serve to stabilize the medium stream flowing into and out of the preparation.

In another advantageous embodiment the pressure in the device is always higher than the critical pressure of the medium so that no phase transition from the gaseous state to the liquid state of the medium can occur.

Instead of using a medium with supercritical pressure, the medium used may be a liquid which is chosen to be such that no phase transition occurs in the operating conditions.

In another advantageous embodiment in which temperatures lower than 2.5° K. occur during operation, the medium is formed by the isotope He³.

Another advantageous embodiment of the device according to the invention is characterized in that the device includes a double-acting piston-like body movable in a cylinder to each end of which a channel is connected having, reckoned from the cylinder, a cooled area, one or more preparations and an area to be cooled, the two channels communicating freely with each other at the side of the area to be cooled, the variations in the relevant parameter at the preparations in one channel being in phase opposition with the variation in this parameter at the preparation in the other channel.

An advantageous construction is thus obtained which does not have a cold piston and this is again advantageous from a viewpoint of thermal leak.

In this device each pair of corresponding preparations from the two channels can co-act with a magnet having rotary poles, which is arranged so that the preparations of each pair are alternately present between the poles.

In another embodiment of the device according to the invention each preparation is formed of a paramagnetic substance, the device including at least one magnet which can produce a constant magetic field, and also including means for relatively displacing each preparation and the associated magnet so that each preparation can be moved alternately into and out of the magnetic field.

Another embodiment includes a device which varies the magnetic field at each preparation so that the greatest variation in the magnetisation of the preparation occurs substantially at the instant when the direction of the movement of the medium reverses.

In another advantageous embodiment a control device at each preparation varies the magnetic field so that, during the movement of the medium to the cooled area, $$\frac{H}{T-\theta}$$

for the relevant preparation remains on the average constant, H being the magnetic field strength, T being the mean absolute temperature of the preparation and θ being the paramagnetic Curie-temperature of the substance forming the preparation.

The magnetisation of the preparation during the cooling in the regenerator thus remains constant, preventing unwanted magneto-caloric effects. The remaining magnetic field is removed at the end of the stroke of the medium.

In order that the invention may be readily carried into effect, several embodiments of devices for producing cold will now be described in detail, by way of example, with reference to the accompanying diagrammatic drawings, in which.

Figure 6:
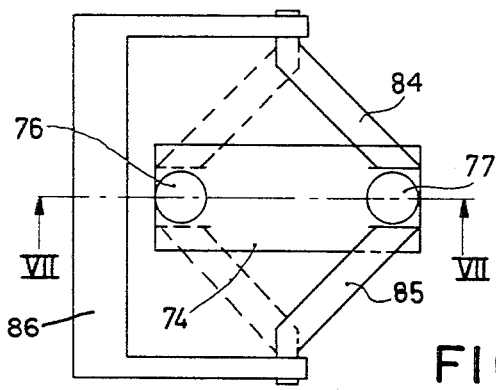
Figure 7:
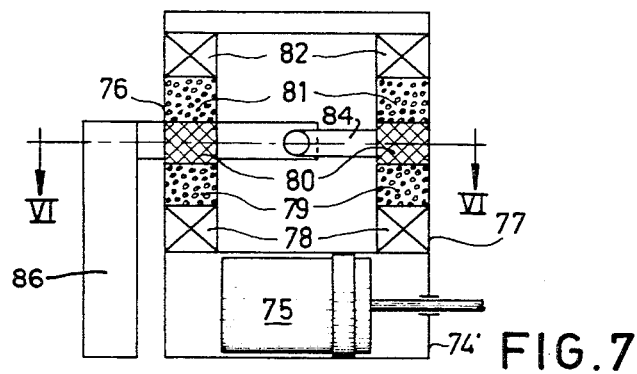

FIGURES 6 and 7 are a sectional view and an elevation view, respectively, of a device for producing cold which includes a double-acting piston movable in a cylinder, a channel being connected to each end of the cylinder and containing a cooler, preparation of a paramagnetic substance and a freezer, which channels are connected together on the side of the freezer, the two preparations being magnetised and demagnetised in phase opposition with the aid of a magnet having rotary poles.

Figure 1:
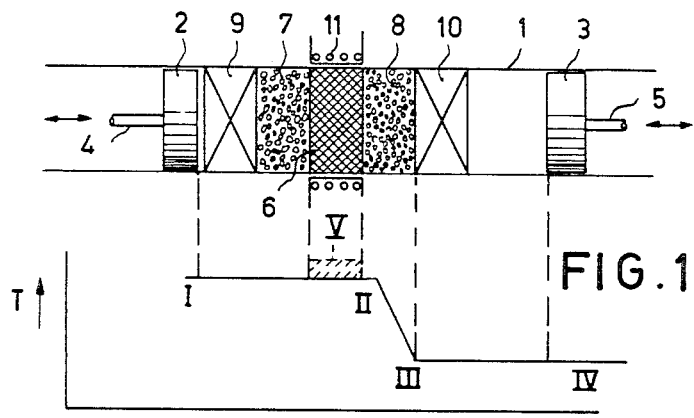
FIGURES 1 and 2 show a device for producing cold in which a medium is passed forwards and backwards through a preparation of a paramagnetic substance by the action of two pistons moving with the same phase.

Referring to FIGURE 1, a cylinder 1 contains two pistons 2 and 3 which are connected through piston rods 4 and 5 to a driving mechanism (not shown) which can move the two pistons with the same phase The cylinder 1 also contains a preparation 6 of a paramagnetic substance which is permeable to gas. On each side of the preparation 6 there are arranged stabilizers 7 and 8, which are gas-permeable masses which may have a structure similar to that of the preparation 6. Further, a cooler 9 and a freezer 10 are provided. The preparation 6 is surrounded by an electromagnet 11 the field of which can be varied. A column of medium is present in the cylinder 1 between the pistons 2 and 3, the medium being chosen such that it has a high specific heat relative to the material of the preparation 6 in the operating conditions prevailing.

The operation of this device is based on the principle that variation in the magnetisation of a paramagnetic substance causes a variation in entropy such that the substance becomes warmer upon magnetisation and becomes colder upon demagnetisation. If, now, the heat and cold produced can be transported to a cooler and a freezer respectively, a refrigerator results. In the device of FIGURE 1 the transportation of heat and cold is effected by the reciprocating medium.

In the situation of FIGURE 1 the pistons occupy their rightmost positions. The cooler 9 has a predetermined temperature obtained by means of an additional cooling system (not shown), for instance a cold-gas refrigerator. Dpendent upon the cooling capacity of the preparation and the amount of heat supplied, the freezer will assume a temperature which is lower than that of the cooler.

The diagram shown under the device illustrates the variation in temperature in the device. From I to II the temperature of the cooler 9 prevails. From III to IV the temperature of the freezer 10 prevails.

The sections II–III of the medium column serves as a regenerator. The temperature in this section varies between the temperature of the cooler and that of the freezer.

The preparation 6 is magnetised by means of the magnet 11 substantially at the instant when the pistons commence to move to the left. The preparation will thus become hotter and this heat is immediately transferred to the medium, as shown by broken lines V in the diagram. When the medium column moves to the left the amount of heat V is absorbed by the cooler 9.

Figure 2:
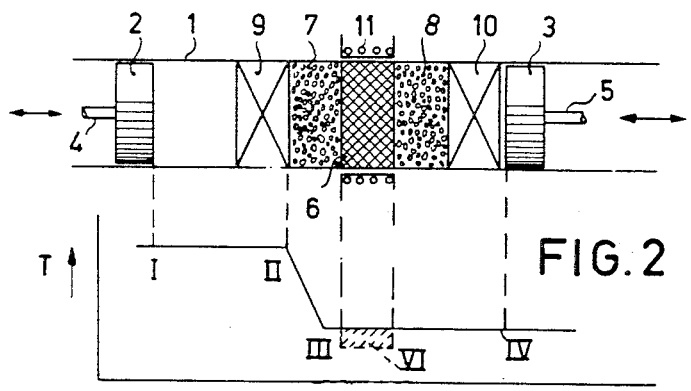

FIGURE 2 shows the situation in which the pistons occupy their leftmost positions. The amount of heat V has been dissipated by the cooler. The heat present in the preparation 6 and the stabilizer (in part) is now stored in the section II–III of the medium column, which is active as a regenerator.

The temperature of this section of the regenerator will vary but slightly since the medium, as previously mentioned, has a high thermal capacity.

The preparation now has the temperature of the freezer.

The preparation is demagnetised by means of the magnet 11 substantially at the instant when the pistons move to the right. The preparation thus becomes colder as shown by broken line VI.

During the movement of the pistons to the right, the amount of cold VI is absorbed by the freezer 10, in which this cold can serve to maintain an object at a low temperature. During this movement, the section II–III of the medium column will again give off heat to the preparation which thus reassumes the temperature of the cooler.

Since the pistons 2 and 3 move with equal phase, the volume of the medium column does not vary. Due to the high thermal capacity of the medium the temperature will also be substantially constant and hence the pressure of the medium.

The function of the stabilizers 7 and 8 is to ensure that the medium quietly flows, as substantially without turbulence, into and out of the preparation 6 and furthermore, that the section of the medium column which is located between II and III cannot reach the freezer nor the cooler during the reciprocating flow of medium.

The temporary storage of an amount of heat which is great relative to the cooling capacity of the device, by means of the section of the medium column which acts as a regenerator constitutes an essential part of the cycle described, since in the absence of this regenerator the cycle would have an extremely low capacity. From the foregoing it will be evident that there is great similarity with the regenerators prior art, which serve to heat and cool respectively a periodic flow of gas. The surprising fact in the present case is that at very low temperatures either a gas or a liquid can be used to bring a preparation consisting of solid material from a higher temperature to a lower temperature and then heating it up again to its initial temperature. The heat given off by the solid material is temporarily stored in the gas or the liquid. For cooling the preparation a cold source only is then needed to compensate for the regeneration losses which occur, as in the "ordinary regenerator," due to imperfect transmission of heat.

The possibility of using gas or liquid for this purpose is based upon their high thermal capacity at low temperatures relative to the thermal capacity of many solids at these temperatures.

In the cycle here described it has been assumed for the sake of simplicity that the variations in magnetic field from minimum to maximum (FIGURE 1) and from maximum to minimum (FIGURE 2) both take place substantially at the instant when the direction of the movement of the pistons reverses. This is just prior to the situation of FIGURE 1, in which the magnetic field is made a maximum at once.

However, upon transition from the situation in FIGURE 1 to that in FIGURE 2, the magnetic field is already varied so that $$\frac{H}{T-\theta}$$

for the preparation remains on the average constant. Consequently the magnetisation of the preparation remains constant and unwanted magneto-caloric effects in the regenerator are prevented.

The remaining magnetic field is removed when the situation of FIGURE 2 is reached.

In this device the medium is formed by a gas at a pressure which is higher than the overcritical pressure thereof, Gases have the property of having great specific heat per unit volume at very low temperature and at high pressure. The operating conditions must then be such that no phase transition to the solid state occurs.

Instead of using a gas, it is possible to use liquid as a medium, but conditions must then be such that no phase transition of the liquid occurs during operation.

In the device of FIGURES 1 and 2 cold can be produced in a continuous process in a simple manner making use of the magneto-caloric effect.

Instead of a preparation of a paramagnetic substance, it is possible to use a preparation of a paraelectrical or superconductive substance which is alternately electrified and magnetised respectively.

Figure 3:
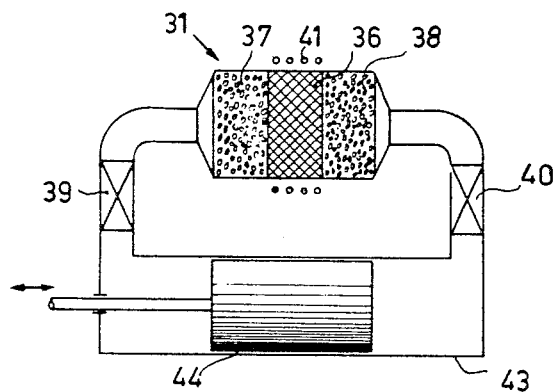
FIGURE 3 shows a device for producing cold which includes a double-acting piston for moving the medium in a reciprocating manner.

FIGURE 3 shows a device for producing cold which roughly corresponds to that of FIGURES 1 and 2.

The device has a cylinder 31 which contains a gas-permeable preparation 36 of a paramagnetic substance. The preparation is bounded on each side by stabilizers 37 and 38 respectively. The cylinder 31 is connected through a cooler 39 and a freezer 40 to a cylinder 43 in which a displacer 44 can move.

A magnet 41 provides for the required variation in the magnetic field.

The operation of this device is otherwise identical with that of the device of FIGURES 1 and 2.

Figure 4:
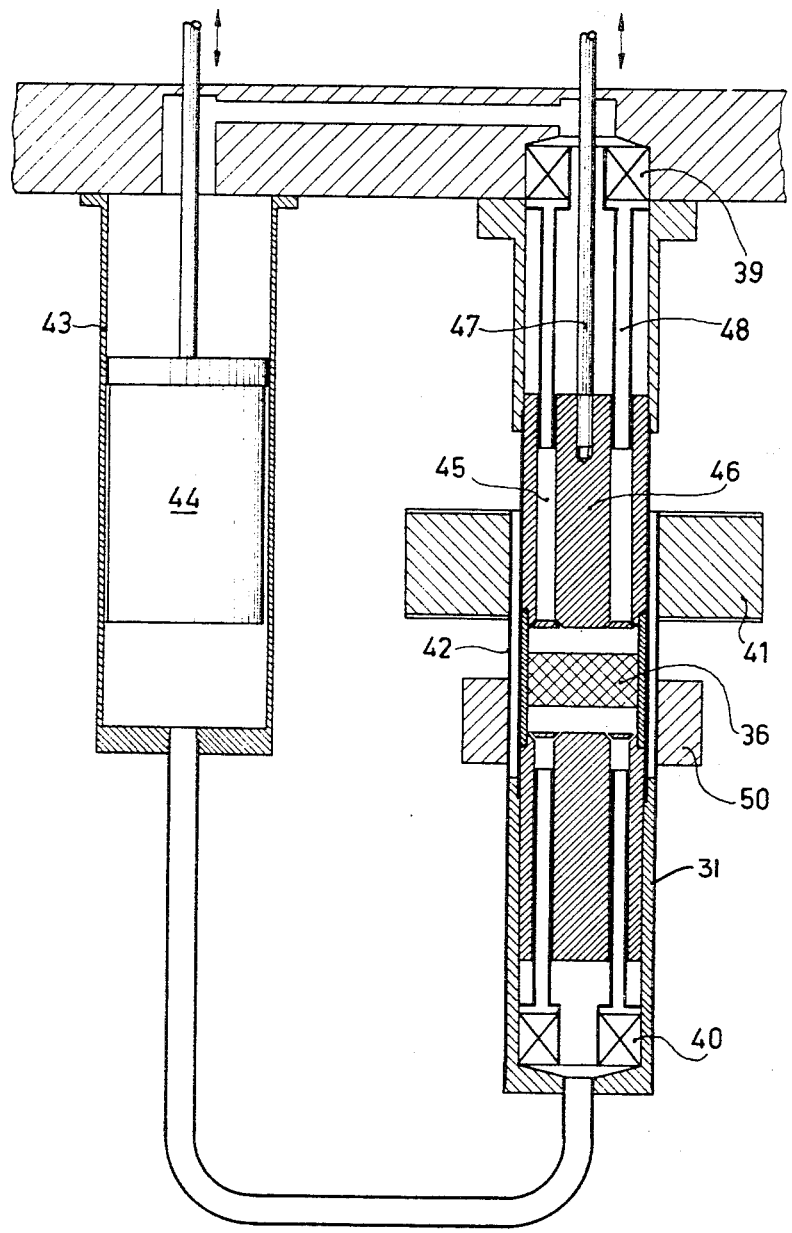
FIGURE 4 shows a device for producing cold which includes a double-acting piston for moving a medium column in a reciprocating manner, the preparation of a paramagnetic substance being movable into and out of a magnetic field.

FIGURE 4 shows a device for producing cold which, as the arrangement of FIGURE 3, includes a displacer 44 which can move in a cylinder 43 for moving the medium column in a reciprocating manner. The device also includes a cylinder 31 in which a freezer 40 and a cooler 39 are fixedly arranged. A gas-permeable paramagnetic preparation 36 is present between the freezer and the cooler. The preparation 36 lies between two masses provided with channels 45. The preparation 36 and the two masses 46 are rigidly connected together, the assembly being secured to a piston rod 47 connected to a driving mechanism (not shown). Pipes 48, which can slide in the channels 45, are connected to the cooler 39 and the freezer 40 respectively. The pipes 48 form, together with the channels 45, the stabilizers.

The cylinder 31 is surrounded by a magnet 41 the field of which is not varied.

The magnet 41 is fitted on a sleeve 42 of material having a good thermal conductivity, for example copper, the other end of sleeve 42 being connected to the freezer 40 in a heat-conductive manner. The magnet is thus cooled to approximately the same temperature as that of the freezer. The cooler 39 is cooled, for example, by means of a cold-gas refrigerator, to approximately 10° K. At this temperature of the cooler the freezer will acquire a temperature of ±3° K.

The coil of the magnet is made of niobium-tin, which is superconducting at this temperature so that a very strong magnetic field can be obtained.

The magnetisation of the preparation 36 is varied by displacing the preparation by means of a rod 47 so that it comes to lie more or less in the magnetic field.

The sleeve 42 is surrounded by a cylinder 50 of nobium-tin. At the end of its downward movement, the preparation 36 lies exactly within the cylinder 50.

The cylinder 50 has been made superconducting before the magnetic field is switched-on, so that no magnetic field will prevail within the sleeve 42. The magnetisation of the preparation thus becomes zero.

The operation of the device is otherwise fundamentally identical with that of the devices of previous figures.

Figure 5:
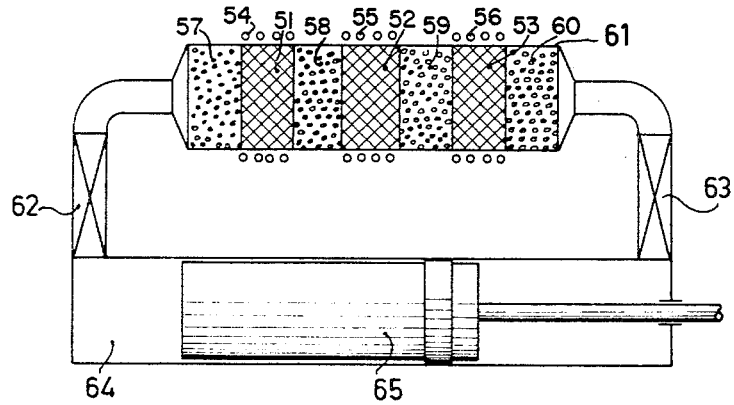
FIGURE 5 shows a device for producing cold which includes a plurality of preparation of a paramagnetic substance which are placed in series.

FIGURE 5 shows a device for producing cold, which contains a plurality of paramagnetic preparations 51, 52 and 53 placed in series and co-acting with associated magnets 54, 55 and 56 respectively, having variable fields.

The preparations are flanked on each side by stabilizers 57, 58, 59 and 60. The cylinder 61 containing the preparations and the stabilizers is connected at its ends, through a cooler 62 and a freezer 63 respectively, to the ends of a cylinder 64 in which a displacer 65 can move.

All of the magnets 54, 55 and 56 are energized or deenergized simultaneously when the direction of the displacer 65 reverses.

The heat produced in the preparations upon magnetisation is dissipated from preparation 53 to preparation 52 and from preparation 52 to 51 and from preparation 51 to the cooler 62 by the moving medium. The heat of preparation 53 is absorbed by preparation 52 and neutralized by part of the cold produced upon demagnetisation.

The heat of preparation 52 is absorbed by preparation 51 upon demagnetisation.

A cold device is thus obtained in which each preparation acts at a subsequent lower temperature so that preparation 53 eventually produces cold at a very low temperature.

In conclusion, FIGURES 6 and 7 show a device for producing cold in which a displacer 75, which can move in a cylinder 74, moves a medium column in two channels 76 and 77 connected to cylinder 74 and each containing successively a cooler 78, a first stabilizer 79, a preparation 80, a second stabilizer 81 and a freezer 82. The channels 76 and 77 communicate with each other at the side of the freezer.

Consequently, in this device, the medium column in channel 76 moves from cooler 78 to freezer 82 during one half of a cycle and moves from freezer to cooler in the other channel. This implies that, since the medium flows in the two channels are in phase opposition, the variations in magnetisation of the preparations 80 in the two channels must also be in phase opposition. This could naturally be achieved by means of two separate magnets.

In the figures, however, this is reached with the use of a magnet having rotary poles 84 and 85 supported by frame 86. These poles embrace the preparation in channel 77 during one half of the cycle and embrace the preparation in channel 76 during the other half thereof. An extremely simple device for varying the magnetic field, is thus obtained.

An important advantage of the device shown in FIGURES 6 and 7 is that the two sides of the displacer feel the temperature of the cooler so that leakage losses of the displacer do not cause losses of cold. Further, there will, of course, also be reduced loss of conduction. Another advantage of this device is that the magnetic field is utilized very satisfactorily.

From the foregoing it will be evident that the invention provides a satisfactory device for producing cold in a continuous process, using the magneto-caloric effect.

What is claimed is:

1. A method of producing cold at low temperatures, including use of a non-ferromagnetic substance which undergoes a variation in entropy upon variation of an external parameter thereof, comprising the steps:

(a) alternately varying said parameter whereby cold and heat are dissipated from the substance;

(b) flowing a fluid medium stream in alternate directions in heat-exchanging relationship with said substance, with heat being correspondingly dissipated from and absorbed by said fluid from said substance, the fluid stream having spaced first and second portions and having high specific heat relative to said substance;

(c) alternately bringing said first portion of the fluid into heat-exchanging relationship with a cooled area after the fluid flowed in one direction and absorbed heat from the substance, and bringing said second portion of the fluid into heat-exchanging relationship with an area to be cooled after the fluid flowed in the other direction and dissipated heat to said substance, said first portion being at a higher temperature than said second portion, and the fluid which reaches one area substantially precluded from reaching the other area.

2. A method of producing cold at low temperatures as claimed in claim 1 wherein the portion of the medium flow between said two portions has a temperature gradient which progressively varies between said two temperatures, and the heat absorbed by said substance from the fluid is substantially equal to the heat dissipated thereto during flow of the fluid in alternate directions.

3. A method as defined in claim 1 wherein:
   (a) said cold and heat dissipation of the substance occurs substantially during said variation of said parameter, and said variation occurs substantially close to the time when the flow direction is reversed.

4. A method as defined in claim 1 wherein said cold and heat dissipation of the substance occurs while the temperature of the substance is maintained substantially constant.

5. A method as defined in claim 1 wherein said steps are repeated cyclically to progressively reduce the temperature of the area to be cooled.

6. A method as defined in claim 1 wherein the substance is a paramagnetic material, and the external parameter thereof which is varied is magnetic field strength.

7. A method of producing cold at low temperatures as claimed in claim 1 wherein the side of the cooled area which is adjacent to said substance is located at a distance from said substance which is at least equal to the length of that portion of the medium stream which has a temperature gradient, said portion of the medium stream regeneratively extracting heat from said substance when flowing in one direction and regeneratively giving off heat to said substance when flowing in another direction.

8. A method of producing cold at low temperatures as claimed in claim 1 wherein the cooled area is cooled to a temperature lower than 30° K.

9. A method of producing cold at low temperatures as claimed in claim 1 wherein the fluid medium is a helium gas and the pressure of said medium is continuously maintained higher than the critical pressure thereof, and the substance is gas permeable.

10. A method of producing cold at low temperatures as claimed in claim 1 wherein the medium and the operating conditions are selected to be such that no phase transition of said medium occurs in operation.

11. A method of producing cold at low temperatures as claimed in claim 10 wherein said selected medium is the isotope He$^3$ having a temperature lower than 2.5° K. in operation.

12. A device for producing cold at low temperatures, comprising:
   (a) a housing member having a channel therein, the channel including first and second spaced zones;
   (b) a non-ferromagnetic substance disposed within the channel, the entropy of the substance being variable upon variation of an external parameter thereof;
   (c) means for varying said parameter;
   (d) a fluid medium stream including first and second spaced portions, the fluid being contained in said channel in heat-exchanging relationship with said substance and being flowable in alternate directions such that said first portion moves to said first zone and subsequently the second portion moves to the second zone with the fluid reaching one zone substantially precluded from reaching the other zone;
   (e) means for moving the fluid;
   (f) means for transmitting heat into the portion of fluid stream in said first zone; and
   (g) means for dissipating heat from the portion of fluid in said second zone; the fluid having a high specific heat relative to said substance, and alternately absorbing heat from the substance while flowing to said second zone, and dissipating heat thereto while flowing to said first zone.

13. A device for producing cold at low temperatures as claimed in claim 12 wherein said fluid is a gas and said substance is gas-permeable and has a cross-section which corresponds to the cross-section of the channel in which it is disposed.

14. A device for producing cold at low temperatures as claimed in claim 12 wherein said means for moving fluid comprises two spaced pistons reciprocally movable in said channel, said pistons having the same stroke and moving substantially in phase whereby the total volume between them is substantially constant.

15. A device for producing cold at low temperatures as claimed in claim 12 wherein said medium is a gas and the device further comprises a gas-permeable mass that has a structure similar to that of the said substance and is disposed in the channel on adjacent sides of the substance for stabilizing the medium flowing therethrough.

16. A device for producing cold at low temperatures as claimed in claim 12 wherein the pressure prevailing in said device is higher than the critical pressure of the relevant medium.

17. A device for producing cold at low temperatures as claimed in claim 12 wherein the selected medium is such as to undergo no phase transition in the conditions prevailing during operation.

18. A device for producing cold at low temperatures as claimed in claim 17 wherein said medium is the isotope He$^3$ and temperatures lower than 2.5° K. occur in operation.

19. A device having two non-ferromagnetic substances and associated elements as defined in claim 12 wherein said means for moving fluid comprises a cylinder and a double-acting piston movable therein, one end of each channel being connected to one end of said cylinder and the remote ends of said channels communicating with each other and in heat-exchanging relationship with the area to be cooled, and variation in the parameter of the substance in one channel being in phase opposition with the variation in the parameter of the substance in the other channel.

20. A device for producing cold at low temeperatures as claimed in claim 12 wherein said substance is formed of a paramagnetic material, the means for varying said parmeter being a magnet for varying the magnetic field in which a substance is present.

21. A device for producing cold at low temperatures as claimed in claim 12 wherein said substance is formed of paramagnetic material, the device further including a magnet which produces a constant magnetic field and means for relatively displacing each substance alternately into and out of the magnetic field.

22. A device for producing cold at low temperatures as claimed in claim 15 wherein means is provided which varies said magnetic field at said substance so that the greatest variation in the magnetization of said substance occurs substantially at the instant when said direction of the movement of said medium reverses.

23. A device for producing cold at low temperatures as claimed in claim 20 wherein the magnetic field is varied so that as the medium moves to the cooled area $$\frac{H}{T-\theta}$$

for the relevant substance remains on the average constant where:

H = magnetic field strength;
T = the mean absolute temperature of the substance; and
$\theta$ = the paramagnetic Curie temperature of the substance.

24. A device for producing cold at low temperatures as claimed in claim 20 wherein the device comprises at least one pair of corresponding substances in two channels, said substances co-act with a magnet having rotary poles with the magnet arranged so that the substances of each pair are alternately present between the poles.

25. A device for producing cold at low temperatures as claimed in claim 12 wherein said means for moving fluid comprises a cylinder and a double-acting piston reciprocally movable therein with spaces on either side thereof, the device further comprises (a) an additional cylinder, the spaces on either side of said piston being connected respectively through said cooled area and area to be cooled to the two ends of said additional cylinder, (b) a movable paramagnetic substance in said additional cylinder, (c) an electromagnet surrounding said additional cylinder, said electromagnet being connected to the area to be cooled in a heat-conductive manner and the coil of which is made of a material that is superconducting at least at the temperature of said cooled area, (d) a sleeve surrounding said additional cylinder and being connected to the area to be cooled in a heat-conductive manner, said sleeve being constituted of a material which is superconducting at least at the temperature of said cooled area, the magnet and said sleeve being spaced apart a distance such that the substance at its extreme positions lies within the magnet on the sleeve.

26. A device as defined in claim 12 wherein:
(a) the temperature of the fluid in heat-exchanging relationship in the second zone is higher than that of fluid in the first zone,
(b) a temperature gradient between these temperatures exists in the fluid between said zones, and
(c) said fluid regeneratively absorbs from the substance substantially the same amount of heat it dissipates thereto.

27. A device as defined in claim 12 wherein said substance is a paramagnetic material, and the external parameter thereof which is varied is magnetic field strength.

28. A device as defined in claim 12 wherein said medium has said relatively high specific heat in the conditions prevailing during operation of the device.

29. A device having a plurality of said substances as defined in claim 27, the substances being in spaced, cooperative relationship with said fluid flowing through and being progressively cooled by said substances.

References Cited

UNITED STATES PATENTS

| | | | |
|---|---|---|---|
| 2,510,800 | 6/1950 | Chilowsky | 62—3 |
| 2,589,775 | 3/1952 | Chilowsky | 62—3 |
| 2,619,603 | 11/1952 | Chilowsky | 62—3 |
| 2,913,881 | 11/1959 | Garwin | 62—3 |
| 3,004,394 | 10/1961 | Fulton | 62—3 |
| 3,119,236 | 1/1964 | Lutes | 62—3 |

WILLIAM J. WYE, *Primary Examiner.*

UNITED STATES PATENT OFFICE
CERTIFICATE OF CORRECTION

Patent No. 3,413,814                                                              December 3, 1968

Johannes Rudolphus van Geuns

It is certified that error appears in the above identified patent and that said Letters Patent are hereby corrected as shown below:

Column 5, line 16, after "cooler" insert -- a --; line 24, "phase" should read -- phase. --; line 50, "Dpendent" should read -- Dependent --. Column 10, line 31, "and" should read -- the --.

Signed and sealed this 17th day of March 1970.

(SEAL)
Attest:

Edward M. Fletcher, Jr.                             WILLIAM E. SCHUYLER, JR.
Attesting Officer                                              Commissioner of Patents